(12) United States Patent
Humphrey et al.

(10) Patent No.: US 9,902,369 B2
(45) Date of Patent: Feb. 27, 2018

(54) APPARATUS AND METHOD FOR DUAL RANGE DETECTION IN A VEHICLE

(75) Inventors: Stephen Humphrey, Livonia, MI (US); Riad Ghabra, Northville, MI (US); Matthew Ryan Honkanen, Waterford, MI (US); Ronald O. King, Brownstown, MI (US)

(73) Assignee: Lear Corporation, Southfield, MI (US)

( * ) Notice: Subject to any disclaimer, the term of this patent is extended or adjusted under 35 U.S.C. 154(b) by 159 days.

(21) Appl. No.: 13/570,936

(22) Filed: Aug. 9, 2012

(65) Prior Publication Data
US 2014/0043139 A1 Feb. 13, 2014

(51) Int. Cl.
*B60R 25/24* (2013.01)
*G07C 9/00* (2006.01)

(52) U.S. Cl.
CPC ........ *B60R 25/245* (2013.01); *G07C 9/00309* (2013.01); *G07C 2009/00357* (2013.01); *G07C 2009/00507* (2013.01); *G07C 2209/63* (2013.01)

(58) Field of Classification Search
None
See application file for complete search history.

(56) References Cited

U.S. PATENT DOCUMENTS

| | | |
|---|---|---|
| 6,512,462 B1 | 1/2003 | Robineau |
| 7,327,806 B2 | 2/2008 | Liem et al. |
| 7,397,344 B2 | 7/2008 | Nantz et al. |
| 7,609,146 B2 | 10/2009 | Tang et al. |
| 2001/0038328 A1 | 11/2001 | King et al. |
| 2007/0024416 A1* | 2/2007 | Tang et al. .................... 340/5.61 |
| 2008/0079602 A1* | 4/2008 | King et al. ............... 340/825.69 |
| 2008/0079603 A1* | 4/2008 | King et al. ............... 340/825.69 |

FOREIGN PATENT DOCUMENTS

CN 102219011 A 10/2011

OTHER PUBLICATIONS

Chinese Decision of Rejection for Application No. 201310339167.6, dated Mar. 7, 2017, 8 pages.
Chinese Office Action and English translation for corresponding Application No. 201310339167.6, dated Sep. 20, 2016, 22 pages.

* cited by examiner

*Primary Examiner* — Firmin Backer
*Assistant Examiner* — Shawna M Kingston
(74) *Attorney, Agent, or Firm* — Brooks Kushman P.C.

(57) ABSTRACT

An apparatus for performing a desired vehicle function is provided. The apparatus comprises a base station configured to receive a command signal indicative of the desired vehicle function while in a receive mode. The base station is further configured to determine whether the received command signal includes at least one of a data component from a plurality of data components and to activate a transmit mode in the event the received command signal includes the at least one of the data component. The base station is further configured to determine whether the received command signal includes at least one additional data component from the plurality of data components while in the transmit mode and to determine that the portable device is positioned within a predetermined range in the event the received command signal includes the at least one additional data component.

21 Claims, 2 Drawing Sheets

| First Modulation Scheme: | ASK_1 | ASK_2 | ASK_3 | ••• | ASK_N |
| Second Modulation Scheme: | |FSK_1| | |FSK_2| | |FSK_3| | | |FSK_N| |

30 ⟶
Desired Function = ASK_1 + ASK_2 + ASK_3 + ••• ASK_N
(First Modulated Scheme)

32 ⟶
Desired Function = FSK_1 or FSK_2 or FSK_3 or ••• FSK_N
(Second Modulated Scheme)

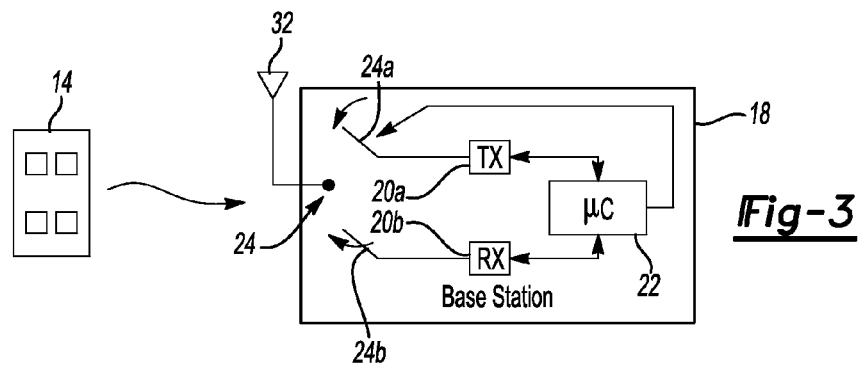
_Fig-3_
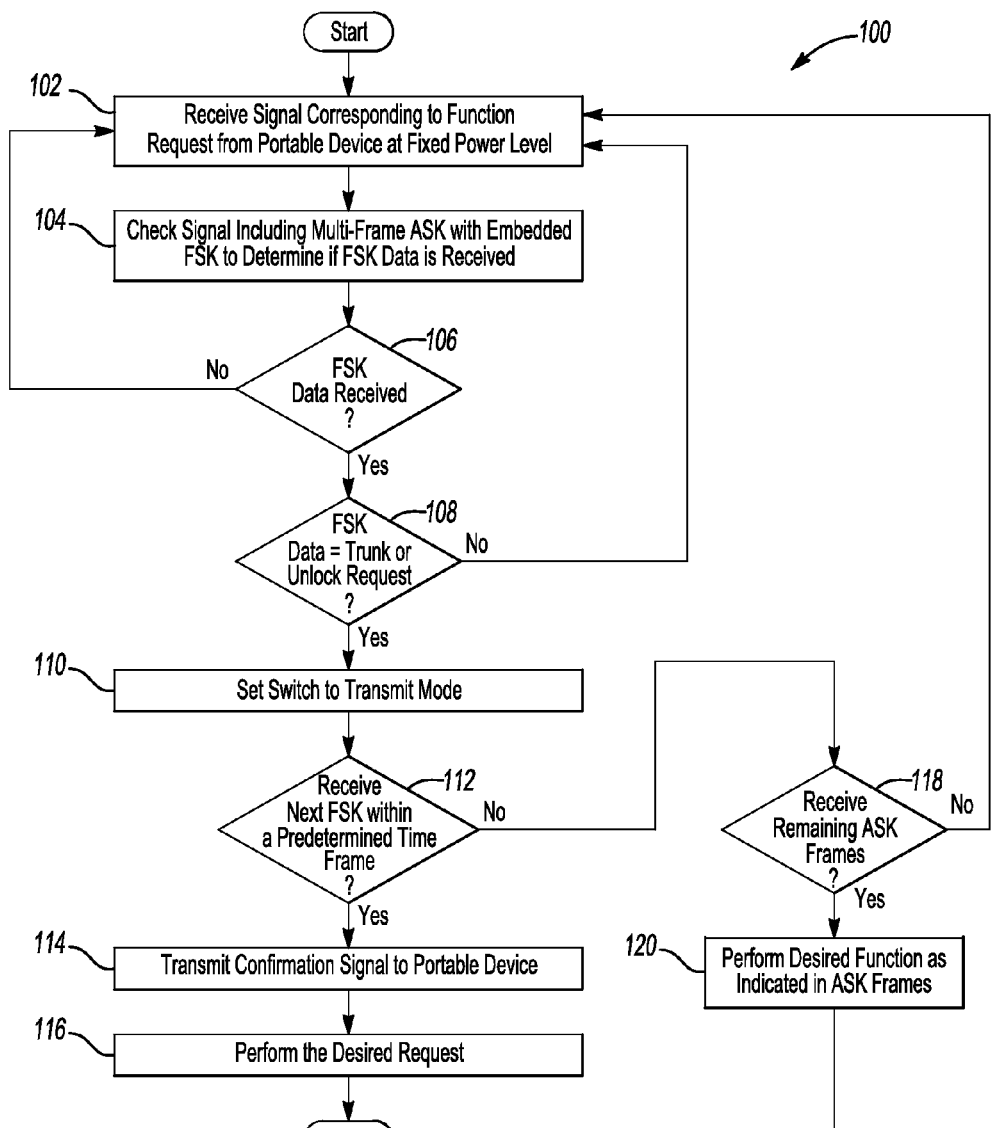
_Fig-4_

APPARATUS AND METHOD FOR DUAL RANGE DETECTION IN A VEHICLE

TECHNICAL FIELD

Embodiments disclosed herein generally related to an apparatus and method for performing a desired function as indicated by a wireless portable device based on a distance of the portable device with respect to a vehicle.

BACKGROUND

It is generally known to implement a dual range detection scheme in connection with a remote keyless entry (RKE) system. One example of such an implementation is set forth in U.S. Pat. No. 7,397,344 (the "'344 patent") to Nantz et al.

The '344 patent discloses a method and a system for operating a controller of and a RKE system to provide for short distance functions that are actuatable from a key fob at a shorter distance from the vehicle than other long distance functions. This may include receiving a desired type of radio frequency signal; actuating a high gain mode of a receiver of the controller; and detecting a message from an acceptable remote keyless entry transmitter. This may also include decoding a function code portion of the message; changing the receiver from the high gain mode to a lower gain mode if the function code is not a long distance function; decoding a remaining portion of the message; determining if the remaining portion of the message was decoded properly; and performing the requested function if the remaining portion of the message was decoded properly.

SUMMARY

An apparatus for performing a desired vehicle function as indicated by a wireless portable device is provided. The apparatus comprises a base station positioned in a vehicle and configured to receive a command signal indicative of the desired vehicle function while in a receive mode. The received command signal includes at least one of a plurality of first data components and a plurality of second data components. The base station is further configured to determine whether the received command signal includes at least one of a second data component from the plurality of second data components and to activate a transmit mode in the event the received command signal includes the at least one of the second data component. The base station is further configured to determine whether the received command signal includes at least one additional second data component from the plurality of second data components while in the transmit mode and to determine that the portable device is positioned within a predetermined range in the event the received command signal includes the at least one additional second data component.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

FIG. 3 depicts a more detailed view of the vehicle base station in accordance to one embodiment; and FIG. 4 depicts a method for performing dual range detection in the vehicle in accordance to one embodiment.

DETAILED DESCRIPTION

Figures 1, 2:
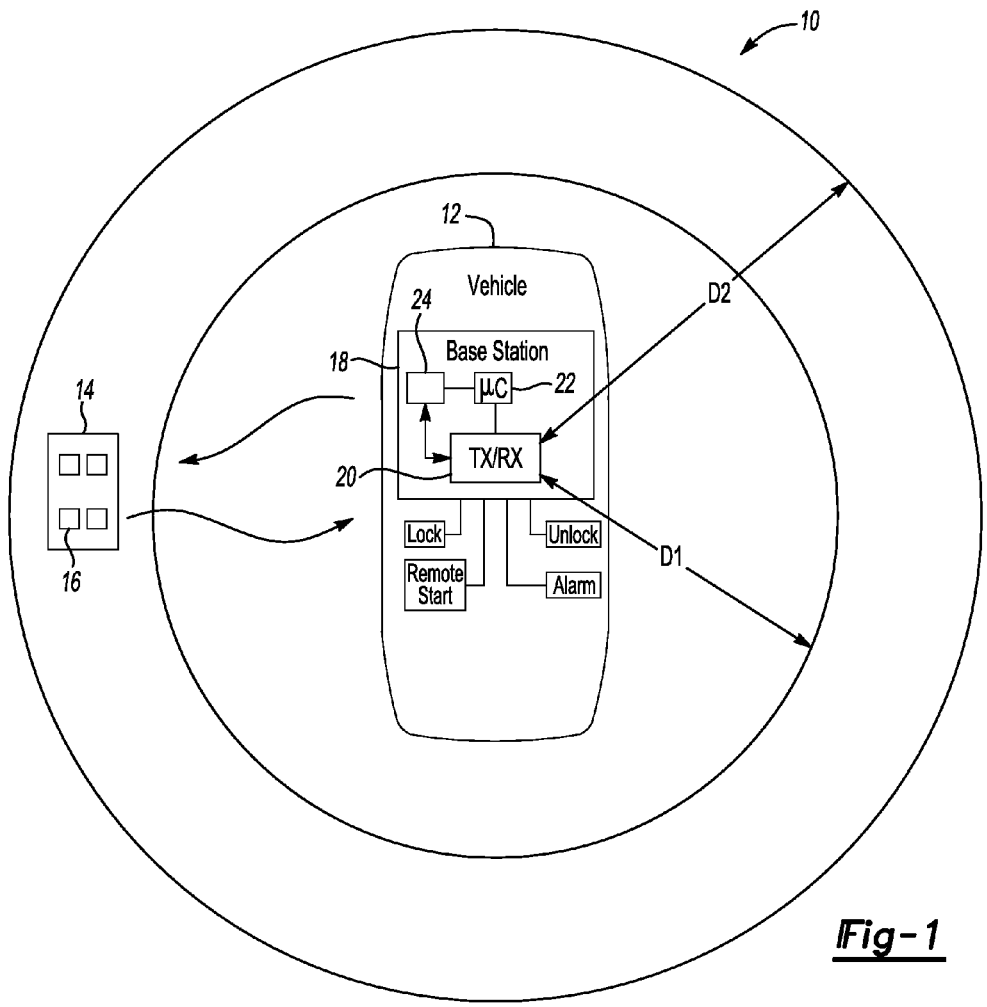
FIG. 1 depicts an apparatus for performing dual range detection in a vehicle in accordance to one embodiment.
FIG. 2 depicts a first modulation scheme and a second modulation scheme in accordance to one embodiment.

As required, detailed embodiments of an apparatus and method are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the apparatus and method.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, RAM, ROM, EPROM, EEPROM, or other suitable variants thereof) and software which co-act with one another to perform operation(s) disclosed herein.

An apparatus and method is disclosed herein that relates to detecting signals indicative of desired functions as transmitted from a wireless portable device. For example, the apparatus and method may determine the distance between the portable device and a vehicle and selectively perform various desired functions such as unlocking vehicle doors and a trunk (or liftgate). Such operations are desirable to execute in the event the wireless portable device is detected to be within a short distance of the vehicle. If these operations were performed when the portable device is positioned at a long distance from the vehicle, this may allow an intruder to freely access the vehicle before the authorized user detects the intrusion or arrives at the vehicle.

While some operations are desirable to be permitted when the wireless portable device is positioned near the vehicle, other operations are desirable to be permitted when the wireless portable device is positioned both at a long distance away and at the short distance from the vehicle. For example, it may be desirable to enable the user to control the wireless portable device to allow the vehicle to lock any one or more doors and a trunk (or liftgate), perform a remote start operation, or trigger the panic alarm. In view of the foregoing, the vehicle is required to ascertain the distance of the wireless portable device in reference thereof to determine if the unlocking operations are within the predetermined range. In the event the vehicle determines that the portable device is positioned at a distance greater than the predetermined range, then the vehicle may not perform the unlock operations in the event such are inadvertently selected on the portable device by the user.

The portable device generally transmits desired function commands to the vehicle via a first modulation scheme and a second modulation scheme. The first modulation scheme generally provides a plurality of first data components that when assembled as a whole at the vehicle, provides an indication as to what the desired function command is. For example, each first data component of the plurality of first data components provides a partial indication of what the desired function command is. When the entire set of the plurality of first data components is received at the vehicle, the vehicle reassembles all of the first data components to determine the desired command function. Once the desired command function is ascertained, the vehicle performs the desired function (e.g., lock, unlock, remote start, etc.) based on the entirety of the plurality of first data components.

The second modulation scheme generally provides a plurality of second data components. However, each second data component provides an indication of what the desired function command is. As such, the vehicle may not have to reassemble the plurality of second data components to ascertain what the desired command function is. A single second data component of the second modulation scheme may be sufficient to indicate the operation that is to be performed. In general, each second data component of the second modulation scheme may be generally embedded in each first data component of the first modulation scheme.

The apparatus as set forth herein is generally configured to wirelessly receive a desired function command from the portable device. The desired function command includes the plurality of first data components pursuant to the first modulation scheme. Each data component of the first modulation scheme may include a second data component of the second modulation scheme. Upon receiving a first of the second data component at the vehicle, the apparatus creates a large attenuation at a receiver thereof. In the event subsequent frame(s) of the remaining first data components or the second data component is received (e.g., overcomes the attenuation) at the vehicle, the vehicle performs the operation as indicated in the desired function command. By overcoming the large attenuation at the vehicle with the subsequent frames of the first data components or of the second data component, the apparatus determines that the wireless portable device is within a short distance of the vehicle and performs the unlock command as requested by the user. These aspects and others will be described in more detail below.

FIG. 1 depicts an apparatus 10 for performing dual range detection in a vehicle 12 in accordance to one embodiment. A wireless portable device ("portable device") 14 is configured to transmit a function command signal to the vehicle 12. The function command signal generally corresponds to one of a lock door/liftgate/trunk command, unlock door/liftgate/trunk command, a panic alarm command, and a remote start command. The vehicle may perform the foregoing operations in response to the function command signal. A plurality of switches 16 is positioned on the portable device 14 to enable a user to transmit the function command signal according to the desired operation. The portable device 14 may be a fob as used in connection with a remote keyless entry (RKE) system or a passive entry passive start (PEPS) system.

The vehicle 12 includes a vehicle base station (or module) 18 for wirelessly receiving the function command signal from the portable device 14. The base station 18 generally includes a transmitter/receiver 20 and a controller 22. The controller 22 activates a lock operation, unlock operation, a remote start operation, and a panic alarm operation based on the function command signal as received at the receiver 20 from the portable device 14.

As noted above, it may be preferable for the apparatus 10 to activate various short range operations such as the unlock operation (e.g., unlocking of the door, tailgate or trunk, etc.) in the event the portable device 14 is detected be a first distance (e.g., d1) (or short distance) away from the vehicle 12. The first distance may correspond to 30 meters or other suitable distance. Such a condition may mitigate the possibility of unauthorized persons from gaining easy entry into the vehicle 12 in the event the user inadvertently selects the unlock operation via the portable device 14. While it may be desirable to perform the short range operations within the first distance d1, it is also desirable for various long range operations such as the lock operation (e.g., locking of the door, tailgate, or trunk, etc.) and/or the remote start operation (e.g., starting of vehicle engine) and the panic alarm operation to be activated at a second distance d2 (or long distance) away from the vehicle, and also at the first distance, d1. The second distance may correspond to 200 meters or other suitable distance from the vehicle.

The base station 18 generally includes a radio frequency (RF) switch 24 that is operably coupled to the controller 22 and the transmitter/receiver 20. In general, the base station 18 utilizes the RF switch 24 and data included on the function command signal as transmitted from the portable device 14 to determine the corresponding distance of the portable device 14 from the vehicle 12 and to further determine which operation is being requested and to activate such an operation based on the distance of the portable device 14 from the vehicle 12. This condition may prevent a short range operation from being executed in the event the portable device 14 is positioned at a distance greater than the first distance d1. The data as included on the function command signal will be discussed in more detail below.

FIG. 2 depicts a first modulation scheme 26 and a second modulation scheme 28 in accordance to one embodiment. The portable device 14 generally transmits the function command signal in accordance to the first modulation scheme 26 and the second modulation scheme 28. In one example, the first modulation scheme 26 may be implemented as an amplitude-shift keying (ASK) modulation scheme and the second modulation scheme 28 may be implemented as a frequency shift key (FSK) modulation scheme.

As shown in FIG. 2, the function command signal generally comprises a plurality of first data components (e.g., ASK_1, ASK_2, ASK_3, . . . ASK_N). The plurality of first data components collectively, provide an indication as to what the desired function the user would like performed at the vehicle (this condition is generally shown at 30 in FIG. 2). Each first data component provides a partial indication of the function. Upon receiving the plurality of first data components, the base station 18 is configured to detect the desired function or operation and transmit data to a corresponding module (not shown) in the vehicle 12 such that the desired function is performed (e.g., lock, unlock, remote start, etc.).

As further shown in FIG. 2, the function command signal generally comprises a plurality of second data components (e.g., FSK_1, FSK_2, FSK_3, . . . FSK_N). Each of the second data components provide an indication as to what the desired function the user would like performed at the vehicle. For example, FSK_1 provides a full indication as to the desired function, FSK_2 provides a full indication as to the desired function, and so on (this condition is generally shown at 32 in FIG. 2). Each of the second data components may be embedded in a corresponding first data component. For example, second data component FSK_1 may be embedded in first data component ASK_1, second data component FSK_2 may be embedded in first data component ASK_2 and so on.

FIG. 3 depicts a more detailed view of the base station 18 in accordance to one embodiment. The base station 18 further includes an antenna 30 for receiving the function command signal from the portable device 14. The base station 18 is configured to also transmit data to the portable device 14. The relevance of this feature will be discussed in more detail in connection with FIG. 4.

In general, the controller 22 is configured to activate the RF switch 24 to operate in transmit or receive mode. For example, the RF switch 24 includes a first switch 24a and a second switch 24b that is operably coupled to the controller 22. When it is necessary for the transmitter 20a to transmit data to the portable device 14, the controller 22 controls the first switch 24a to close thereby enabling transmission to the portable device 14. When it is necessary for the receiver 20b to receive data from the portable device 14, the controller 22 controls the second switch 24b to close thereby enabling receipt of the function command signal from the portable device 14. The controller 22 may activate the second switch 24b in most cases to place the RF switch 24 in the receive mode since it will not know when the portable device 14 will transmit data thereto. In moments in which the base station 18 is required to transmit data, the controller 22 may activate the first switch 24a to enable data transmission.

It is recognized however that while the base station 18 is in the transmit mode, the controller 22 may still receive data from the portable device 14. For example, while the base station 18 is in the transmit mode (e.g., the first switch 24a is active), a large amount of attenuation is present at the receiver path (e.g., from the receiver 20 to the controller 22) since the second switch 24b is deactivated. The receiver 20 may still detect the presence of a signal while the base station 18 is in the transmit mode if the signal strength (or voltage) of the incoming signal is high. If the signal strength, or voltage of the incoming signal is high, such a condition may indicate that the portable device 14 is close to the vehicle 12. The base station 18 may utilize the characteristics of the RF switch 24 to determine the distance of the portable device 14 for purposes of distinguishing between the short range functions and long range functions. This condition will be explained in more detail below.

FIG. 4 depicts a method 100 for performing dual range detection in the vehicle 12 in accordance to one embodiment. It is recognized that various operations of the method 100 may be performed sequentially, in parallel, or in any combination thereof.

In operation 102, the base station 18 receives the function command signal corresponding to the desired function to be performed by the user from the portable device 14. The portable device 14 transmits the function command signal at a fixed power level.

In operation 104, the base station 18 checks the data on the function command signal once received. For example, the base station 18 checks the function command signal for the presence of the first data components (e.g., multi-frame carrying data that is ASK modulated).

In operation 106, the base station 18 determines whether at least one second data component (e.g. a frame or component carrying data that is FSK modulated (or FSK_N)) is received along with the first data components on the function command signal. If the at least one second data component has been received, then the method 100 moves to operation 108. If not, then the method 100 moves back to operation 102.

In operation 108, the base station 18 determines whether the at least one second data component indicates that the desired function to be performed is an unlock request. If this condition is true, then the method 100 moves to operation 110. If this condition is false, then the method 100 moves back to operation 102.

In operation 110, the controller 22 of the base station 18 activates the first switch 24a to place the base station 18 in the transit mode. As noted above, this condition creates a large attenuation in the receive path (e.g., receiver 20b and the controller 22) of the base station 18.

In operation 112, the base station 18 determines whether an additional second data component (e.g., another FSK modulated data component) on the function command signal (e.g., this relates to the same function command signal as received in operation 102) is received within a predetermined time frame. If this condition is true, then the method 100 moves to operation 114. If not, the method 100 moves to operation 118. In general, if this condition is true, then the function command signal is able to overcome the large amount of attenuation created as a result of the base station 18 being placed in the transmit mode.

In operation 114, the base station 18 transmits a confirmation signal to the portable device 14 to indicate that function command signal has been successfully received.

In operation 116, the base station 18 performs the desired request such as the unlock of the door/liftgate/trunk operation.

In operation 118, the base station 18 determines whether the remaining first data components (e.g., remaining ASK frames) have been received and whether the full message as indicated by the first data components can be correctly assembled. If this condition is true, then the method 100 moves to operation 120. If not, then the method 100 moves back to operation 102. For example, assuming the base station 18 does not receive the additional second data component as set forth in operation 112, the base station 18 may still perform the unlock function after the remaining ASK frames are correctly received and if the ASK message corresponds to an unlock command.

In operation 120, the base station 18 performs the desired function (e.g., lock, remote start, etc.). It is recognized that the base station 18 performs the desired function even if the function command signal corresponds to the unlock request.

A determination of the distance of the portable device 14 may be determined based on another implementation. For example, the portable device 14 may include repeating frames of data indicative of the desired function (e.g., lock, unlock, alarm, remote start, etc.) on the function command signal in one modulation scheme. The repeating frames of data may correspond to a predetermined number of repeating frames, n. The portable device 14 may transmit the repeating frames of data to the base station 18. In the event the base station 18 detects receipt of n–a (where a is constant that is less than n and greater than 1) frames correctly of the function command signal and the function command signal corresponds to the unlock request, the base station 18 may then control the RF switch 24 to be in the transmit mode. If the base station 18 receives one or more remaining (or subsequent) number of repeating frames while in the transmit mode (e.g., overcomes the attenuation created in the receive path), then the base station 18 may enable the unlock operation to be performed.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for performing a desired vehicle function as indicated by a wireless portable device based on distance, the apparatus comprising:
    a base station positioned in a vehicle and being arranged to be in one of a transmit mode and a receive mode, the base station being configured to:
        receive a command signal indicative of the desired vehicle function from the portable device while in the receive mode, the received command signal including at least one of plurality of first data components and a plurality of second data components;
        determine whether the received command signal includes at least one of a second data component from the plurality of second data components;
        activate the transmit mode in the event the received command signal includes the at least one of the second data component;
        generate an attenuation condition thereof in response to activating the transmit mode;
        determine whether the received command signal includes at least one additional second data component from the plurality of second data components after generating the attenuation condition; and
        determine that the portable device is positioned within a predetermined range in the event the received command signal includes the at least one additional second data component,
    wherein the base station includes a switch that activates a transmitter to place the base station in the transmit mode; and
    wherein the base station is further configured to generate the attenuation condition thereof in response to the switch activating the transmitter.

2. The apparatus of claim 1 wherein the base station is further configured to enable an unlocking operation based on the received command signal in the event the portable device is detected to be within the predetermined range.

3. The apparatus of claim 1 wherein the base station is further configured to prevent an occurrence of an unlocking operation in the event the portable device is detected to be outside of the predetermined range.

4. The apparatus of claim 1 wherein the base station is further configured to determine that the portable device is positioned within the predetermined range in the event remaining first data components of the plurality of first data components are received after activating the transmit mode.

5. The apparatus of claim 1 wherein the plurality of first data components are modulated on the received command signal in accordance to a first modulation scheme.

6. The apparatus of claim 5 wherein the first modulation scheme is an amplitude-shift keying (ASK) modulation.

7. The apparatus of claim 6 wherein the plurality of second data components are modulated on the received command signal in accordance to a second modulation scheme.

8. The apparatus of claim 7 wherein the second modulation scheme is a frequency-shift keying (FSK) modulation.

9. An apparatus for performing a desired vehicle function as indicated by a wireless portable device, the apparatus comprising:
    a base station positioned in a vehicle and being configured to:
        receive a command signal indicative of the desired vehicle function from the portable device, the received command signal including at least one of a plurality of first data components and a plurality of second data components;
        determine whether the received command signal includes at least one of a second data component from the plurality of second data components;
        generate an attenuation in a receive path thereof in the event the received command signal includes the at least one of the second data component;
        determine whether the received command signal includes at least one additional second data component from the plurality of second data components after generating the attenuation; and
        determine that the portable device is positioned within a first distance of the vehicle in the event the received command signal includes the at least one additional second data component;
    wherein the base station includes a switch for causing the attenuation at the receive path of the base station when the base station is in a transmit mode with the portable device in the event the received command signal includes the at least one of the second data component;
    wherein the switch activates a transmitter to place the base station in the transmit mode; and
    wherein the base station is further configured to generate the attenuation at the receive path in response to the switch activating the transmitter.

10. The apparatus of claim 9 wherein the base station is further configured to enable an unlocking operation based on the received command signal in the event the portable device is detected to be within the first distance.

11. The apparatus of claim 9 wherein the base station is further configured to determine that the portable device is positioned within a second distance of the vehicle in the event the received command signal does not include the at least one of the second data component, the second distance being greater than the first distance.

12. The apparatus of claim 11 wherein the base station is further configured to enable a locking operation based on the received command signal in the event the portable device is detected to be within one of the first distance and the second distance.

13. The apparatus of claim 9 wherein the plurality of first data components are modulated on the received command signal in accordance to a first modulation scheme.

14. The apparatus of claim 13 wherein the first modulation scheme is an amplitude-shift keying (ASK) modulation.

15. The apparatus of claim 14 wherein the plurality of second data components are modulated on the received command signal in accordance to a second modulation scheme.

16. The apparatus of claim 15 wherein the second modulation scheme is a frequency-shift keying (FSK) modulation.

17. The apparatus of claim 9 wherein the base station is further configured to determine that the portable device is positioned within the first distance in the event remaining first data components of the plurality of first data components are received after generating the attenuation.

18. An apparatus comprising:
    a base station for being positioned in a vehicle, the base station being programmed to:
        receive a command signal indicative of a desired vehicle function from a portable device in one of within a predetermined range and outside of the predetermined range, the received command signal including at least one of plurality of first data components and a plurality of second data components;
determine whether the received command signal includes at least one of a second data component from the plurality of second data components;
generate an attenuation condition in response to the received command signal including the at least one of the second data component;
determine whether the received command signal includes remaining first data components of the plurality of first data components after generating the attenuation condition, and
determine that the portable device is positioned within the predetermined range from the vehicle in the event the received command signal includes the remaining first data components,
wherein the base station includes a switch that activates a transmitter to place the base station in a transmit mode; and
wherein the base station is further configured to generate the attenuation condition thereof in response to the switch activating the transmitter.

19. The apparatus of claim 1 wherein the base station is further configured to transmit data to the portable device while in the transmit mode and to receive remaining first data components of the plurality of first data components of the command signal during the attenuation condition in the transmit mode.

20. The apparatus of claim 9 wherein the base station is further configured to receive remaining first data components of the plurality of first data components of the command signal during the attenuation in the transmit mode.

21. The apparatus of claim 18 wherein the base station is further configured to receive remaining first data components of the plurality of first data components of the command signal during the attenuation condition in the transmit mode.

* * * * *